(12) United States Patent
Laghezza et al.

(10) Patent No.: US 11,867,827 B2
(45) Date of Patent: Jan. 9, 2024

(54) RADAR SENSING

(71) Applicant: NXP B.V., Eindhoven (NL)

(72) Inventors: Francesco Laghezza, Eindhoven (NL); Julian Renner, Wurmannsquick (DE); Frans M. J. Willems, Geldrop (NL); Semih Serbetli, Eindhoven (NL); Alex Alvarado, 's-Hertogenbosch (NL)

(73) Assignee: NXP B.V., Eindhoven (NL)

( * ) Notice: Subject to any disclaimer, the term of this patent is extended or adjusted under 35 U.S.C. 154(b) by 522 days.

(21) Appl. No.: 16/402,932

(22) Filed: May 3, 2019

(65) Prior Publication Data
US 2020/0348389 A1 Nov. 5, 2020

(51) Int. Cl.
G01S 7/00 (2006.01)
G01S 13/28 (2006.01)

(52) U.S. Cl.
CPC ............ G01S 7/006 (2013.01); G01S 13/288 (2013.01)

(58) Field of Classification Search
CPC .... G01S 13/325; G01S 13/343; G01S 13/931; G01S 7/023; G01S 7/0234; G01S 7/4008; G01S 13/347; G01S 13/288; G01S 7/282; G01S 7/006; G01S 7/352; G01S 7/292; H04B 1/0028; H04B 1/30; H04B 10/516; H04B 10/5161; H04B 10/548; H04B 1/0475; H04B 10/5561; H04B 2001/045; H04B 7/0413; H04L 1/0041; H04L 27/36; H04L 27/12; H04L 27/18; H04L 27/38
USPC ....... 375/329, 279; 342/82, 70, 165, 174, 18
See application file for complete search history.

(56) References Cited

U.S. PATENT DOCUMENTS

| | | | |
|---|---|---|---|
| 5,892,477 A * | 4/1999 | Wehling | G01S 13/34 342/18 |
| 9,271,241 B2 | 2/2016 | Kenney et al. | |
| 9,344,238 B2 | 5/2016 | Vermani et al. | |
| 9,698,939 B2 * | 7/2017 | Oveis Gharan | H04B 10/5055 |
| 10,396,899 B1 * | 8/2019 | Kim | H04B 10/541 |
| 10,601,517 B1 * | 3/2020 | Kim | H04B 10/541 |
| 10,673,479 B2 * | 6/2020 | Fernando | H04B 7/0617 |

(Continued)

FOREIGN PATENT DOCUMENTS

WO WO-2016199144 A1 * 12/2016 ............... H04L 1/08

OTHER PUBLICATIONS

Feger, R., "A Delta-Sigma Transmitter Based Heterodyne FMCW Radar", Proceedings of the 10th European Radar Conference, Oct. 9-11, 2013.

(Continued)

*Primary Examiner* — Olumide Ajibade Akonai

(57) ABSTRACT

Aspects of the present disclosure are directed to radar apparatuses and methods involving the communication of data with radar signals. As may be implemented with one or more embodiments, a sequence of radar waveforms are transmitted as RF signals, the RF signals carrying communication data encoded onto a ramped radar carrier signal via phase-shift keying (PSK) modulation. Such modulation may utilize a modified, reduced-angle modulation with phase angles of less than $\pi$. Object-reflected versions of the RF signals are received and demodulated by deramping the received object-reflected versions of RF signals using a linearized version of the radar waveforms (e.g., without PSK modulation). This approach can mitigate compression peak loss.

21 Claims, 6 Drawing Sheets

(56) References Cited

U.S. PATENT DOCUMENTS

| | | | | |
|---|---|---|---|---|
| 10,700,807 | B1* | 6/2020 | Vassilieva | H04J 14/06 |
| 10,848,269 | B2* | 11/2020 | Ebrahimzad | H04B 10/556 |
| 2006/0202885 | A1* | 9/2006 | Chen | G01S 13/003 |
| | | | | 342/134 |
| 2008/0143587 | A1* | 6/2008 | Johnson | G01S 13/48 |
| | | | | 342/25 R |
| 2011/0193739 | A1* | 8/2011 | Strauch | H04L 27/2647 |
| | | | | 342/146 |
| 2016/0047892 | A1* | 2/2016 | Franceschini | G01S 13/003 |
| | | | | 342/60 |
| 2017/0031005 | A1* | 2/2017 | Jaeger | G01S 7/35 |
| 2017/0212213 | A1* | 7/2017 | Kishigami | G01S 13/284 |
| 2018/0259632 | A1* | 9/2018 | Kishigami | G01S 7/2921 |
| 2020/0162172 | A1* | 5/2020 | Sridhar | H04B 10/616 |
| 2020/0191939 | A1* | 6/2020 | Wu | G01S 7/354 |
| 2020/0228386 | A1* | 7/2020 | Jardel | H04L 1/0042 |

OTHER PUBLICATIONS

Nowak, M., "Mixed-modulated Linear Frequency Modulated Radar-communications", IET Radar, Sonar & Navigation, The Institution of Engineering and Technology UK, vol. 11, Iss. 2, pp. 313-320, Feb. 2017.

B. Pollock, N. Goodman, "Structured De-Chirp for Compressive Sampliing of LFM Waveforms," IEEE 7th Sensor Array and Multichannel Signal Processing Workshp (SAM) (2012).

Dimitri Dessources, "Implementation of RF Steganography Based Joint Radar/Communication LFM Waveform Using Software Defined Radio," Wright State University (May 2017).

Zhang, Z., "Bio-Inspired RF Steganography via Linear Chirp Radar Signals", IEEE Communications Magazine, vol. 54, Issue 6, Jun. 23, 2016.

\* cited by examiner

RADAR SENSING

OVERVIEW

Aspects of various embodiments are directed to radar-based sensing, as may involve the communication of radar signals with information embedded therein, and processing of reflections of the radar signals.

Radar systems are utilized in a variety of applications for ascertaining environmental characteristics, such as those which may relate to distance, position or speed. For instance, automotive and other vehicle systems may utilize radar to ascertain distance between a vehicle using the radar and objects and/or other vehicles. Generally, the distance that a radar signal, such as sound, light or other radiation, travels is used to characterize the environment. A round-trip distance that a radar signal travels from a transmitter to an object and (as reflected from the object) back to a receiver can be determined based upon characteristics of the signal and the medium in which the signal travels.

Using an automobile as an example, a signal can be modulated according to a specific waveform principle (e.g., a frequency modulated continuous wave (FMCW) signal). Such a signal may be transmitted at a predetermined carrier frequency, and reflected signals can be detected and used to determine a distance to an object. The transmission frequency of a continuous radar signal may be modulated in the form of ramps, and a baseband signal can be generated from a received signal by mixing with the transmitted signal. Such approaches can be used, for example, for sensing distance to an object, or sensing a velocity at which an object or vehicle is moving, as well as relative positioning (e.g., an angle between an object and a vehicle).

While such approaches have been very useful, many radar systems, high resolution and long measurement range can be challenging to achieve. Further, many environments benefit from the communication of data within signals. However, data communication with radar signals can be challenging to implement, while also maintaining desirable radar operation. For instance, data may complicate a radar signal, making the radar signal challenging to process.

These and other matters have presented challenges to radar-based implementations, for a variety of applications.

SUMMARY

Various example embodiments are directed to issues such as those addressed above and/or others which may become apparent from the following disclosure concerning radar communications and related signal processing, and which may serve to mitigate losses.

In certain example embodiments, aspects of the present disclosure involve coding radar signals by phase-shifting the signals, and by processing reflections of the coded radar signals to mitigate loss. In some implementations, such an approach involves applying phase-shift keying (PSK) modulation, with a reduced phase angle (e.g., less than $\pi$) to a frequency-ramped carrier signal, and using the raw frequency-ramped carrier signal to deramp reflections of the radar signals. Such approaches may involve utilizing multiple constellation points at the transmitter sides.

In a more specific example embodiment a radar sensing apparatus includes transmit-side circuitry to transmit, in a radar field of view and in a radio frequency (RF) range, a sequence of radar waveforms as RF signals while ramping over a plurality of frequencies. The RF signals carry communication data encoded via phase-shift keying (PSK) modulation. The apparatus further includes receive-side circuitry to receive object-reflected versions of RF signals. The receive-side circuitry also demodulates the received signal waveforms. In various implementations the PSK-modulated communication data signals can be used in this regard for determining radar characteristics, such as for ascertaining distances to objects in an environment, while also utilizing the data therein for communicating to remote receivers.

In another specific example embodiment, a radar sensing apparatus includes at least one antenna, transmit-side circuitry, and receive-side circuitry. The transmit-side circuitry includes a first digital data processing module, which transmits a sequence of radar waveforms as RF signals over a radar field of view in a radio frequency (RF) range, from the at least one antenna while ramping over a plurality of frequencies. The RF signals carry communication data encoded via PSK modulation. The receive-side circuitry includes a second digital data processing module, receives object-reflected versions of the RF signals and demodulates the received signal waveforms by deramping the received object-reflected versions of RF signals using a linearized version of the radar waveforms transmitted from the at least one antenna. Accordingly, losses (e.g., dynamic range losses) can be mitigated via use of the linearized version of the radar waveforms (e.g., a raw FMCW carrier signal, prior to phase modulation). Further the PSK modulation can be applied at a phase angles of less than $\pi$, facilitating enhanced data communication while also mitigating loss at the receive-side circuitry for radar use.

As may be implemented with one or more embodiments, a method for use with a radar sensing apparatus is carried out as follows. A sequence of radar waveforms are transmitted, from transmit-side circuitry in a radar field of view and in a radio frequency (RF) range, as RF signals while ramping over a plurality of frequencies. The RF signals carry communication data encoded via PSK modulation. In receive-side circuitry, object-reflected versions of the RF signals are received and demodulated by deramping the received object-reflected versions of RF signals using a linearized version of the radar waveforms to mitigate losses.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIGS. 2A-2F show respective plots characterizing the use and processing of phase-shifted radar signals in accordance with the present disclosure, in which:

FIG. 2A shows an initial bipolar phase-shift keying (BPSK) signal with a phase shift of $\pi$ (180 degrees), FIG. 2B shows a phase-shifted BPSK signal as in FIG. 2A with reduced phase angles, FIG. 2C shows an initial FMCW radar signal and BPSK version of the FMCW signal, FIG. 2D shows the initial FMCW radar signal of FIG. 2C and a reduced-phase shift BPSK signal, FIG. 2E shows the phase of the initial FMCW radar signal and of the BPSK version of the FMCW, FIG. 2F shows the phase of the initial FMCW radar signal of FIG. 2C and of a reduced-phase shift BPSK (r-BPSK) version of the signal;

Figure 1:
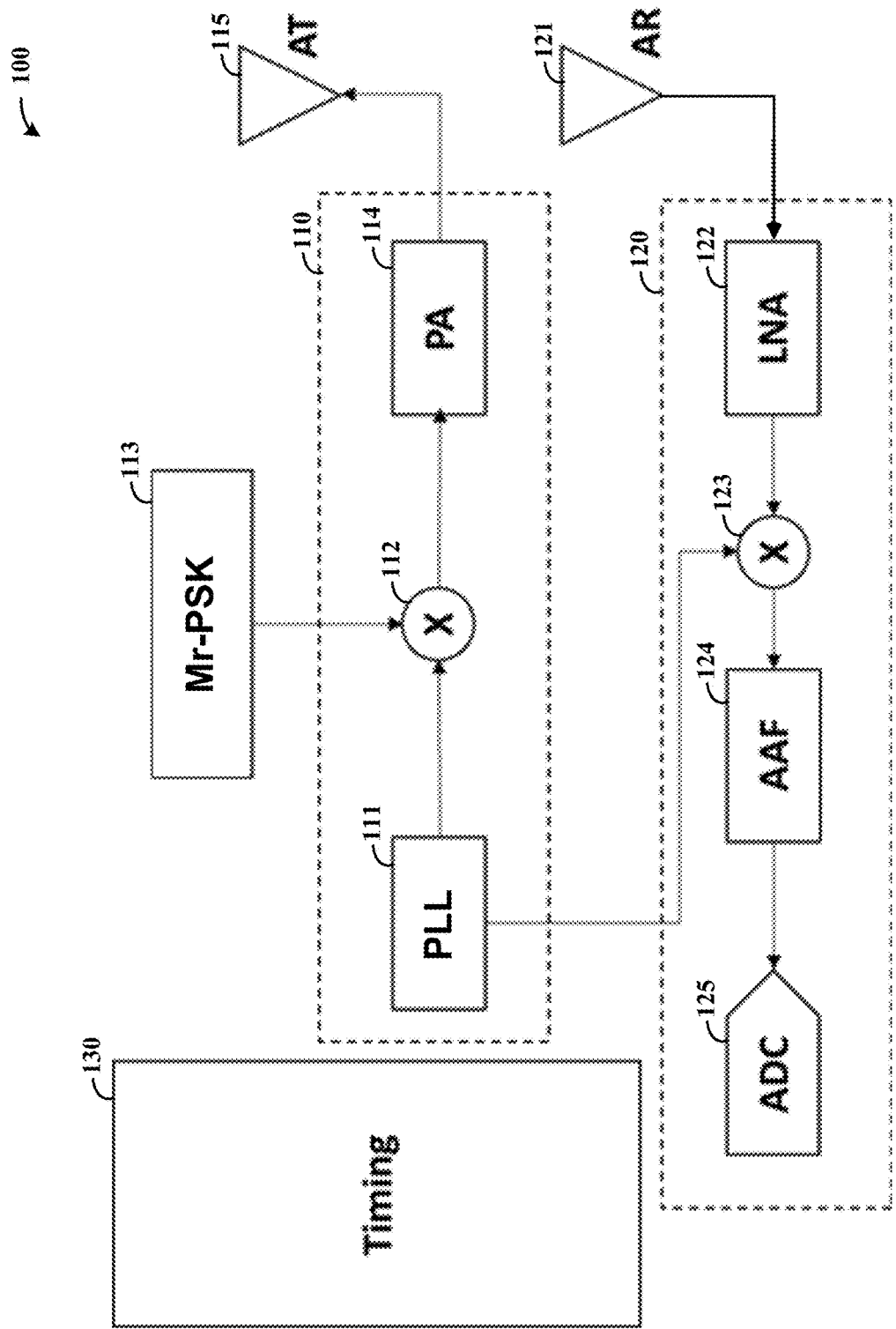
FIG. 1 shows an apparatus having an example transmit-side and receive-side circuitry, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving radar-based communications. In certain embodiments, radar signals are transmitted for both radar and communication uses, and reflections thereof are demodulated using a version of the radar signals with the data therein omitted, in a manner that mitigates dynamic range loss. In specific implementations, a demodulation scheme deramps received signals (containing embedded communications) with a linear FMCW signal, which mitigates or reduces losses. In certain implementations, aspects of the present disclosure have been shown to be beneficial when used in the context of transmitting radar signals for both communicating data to remote receivers and receiving reflections of the radar signals for radar functions. For example, such approaches may be used in automotive applications in which a vehicle transmits radar signals for radar functions, such as for determining distance, relative radial velocity and angle between the vehicle and objects, while also using the same signals for communicating between vehicles. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

As may be implemented in accordance with one or more embodiments, phase modulation can be applied on top of an existing frequency sweep for embedding communication messages within a radar signal. For instance, the frequency of a carrier signal may be swept between starting and ending frequencies (e.g., ramped up or ramped down), and can be mixed by another baseband phase modulated signal to embed data in the frequency-swept carrier signal. This may be referred to as generating a radar signal with communications embedded therein, such as a RadCom signal. In particular implementations, frequency-swept carrier signal is mixed using a phase shift keying (PSK) modulated signal. Reflections of the frequency-swept carrier signal are processed using the carrier signal, such as by using the carrier signal in its (raw) form prior to PSK.

In specific embodiments, the raw frequency-swept carrier signal is mixed at transmitter-side circuitry using PSK with a (reduced) phase angle of less than $\pi$ (180 degrees) between respective phases, and the resulting signal is transmitted. The raw frequency-swept carrier signal is also provided to receiver-side circuitry and used to deramp reflections of the reduced-angle PSK signal. In connection with such approaches, it has been recognized/discovered that applying PSK with a reduced angle for embedding data in radar signals, and further deramping reflections of the radar signals by mixing the raw frequency-swept carrier signal therewith, can mitigate losses. For instance, it has been recognized/discovered that, such an approach can mitigate radar performance issues that may be caused by increased sidelobe levels in the range profile of the radar signal and loss in the received energy from a target after signal processing.

A variety of approaches to reducing the angle of PSK modulation can be carried out to suit particular applications. For instance, different ranges of phase angle variation can be utilized, as can different numbers of phases. Relative to BPSK using phase angles of $\pi$ between respective phases, phase angles of a fraction or of multiple fractions thereof may be utilized. Certain examples are shown in the following figures, with respective phase differences between elements of the PSK constellation as shown on the diagrams lowering the impact of the PSK modulation upon radar performance. Multiple constellation points can be used to enhance the raw data rate as well as the ability to detect reflected radar signals. For general information regarding PSK schemes, and for specific information regarding a reduced-PSK scheme that may be implemented in accordance with one or more embodiments herein, reference may be made to Dimitri Dessources, "Implementation of RF Steganography Based Joint Radar/Communication LFM Waveform Using Software Defined Radio," Thesis submitted to Wright State University, 2017, which is fully incorporated by reference.

Combined radar and data communications as characterized herein may be implemented for a variety of applications, to suite a variety of uses. For instance, automated or self-driving capabilities can be enabled if an elevated level of perception of the surrounding environment can be achieved. Radar and communication sensors as characterized herein may be used in this regard, such as for vehicles-to-x (vehicles-to-infrastructure, or V2X) communications and radar, to address the tasks of communicating information and perceiving the environment. In this framework, combining these features in an apparatus or system facilitates intelligent transportation platforms, reliable and robust sensing-of and communication-among road users, in an efficient and cost-effective fashion that may further provide reduced size and power consumption. Accordingly, various approaches herein utilizing, for example, applying reduced-PSK to a carrier signal at a transmitter together with deramping at a corresponding receiver using the (raw) carrier signal facilitates both cross- and auto-correlation performances, and mitigates losses in energy of the reflected signals after the signal processing (e.g., dynamic range loss).

In a particular embodiment, reduced-angle phase modulation is applied on a linear radar chirp and transmitted, therein communicating data to remote receivers in accordance with the phase modulation. Reflections of the radar chirp are demodulated by deramping the reflections with the pure linear radar chirp (prior to phase modulation) to reduce the energy loss in the reflections. Accordingly, a tradeoff can be achieved between the need or desire to embed communications via phase modulation at a particular communication rate, and the ability to utilize reflections of the radar chirp for radar sensing.

The embodiments characterized herein may be implemented in a variety of types of circuitry. In some embodiments, a radar sensor module includes an RF transceiver, analog-to-digital converter (ADC), digital signal processor and a data interface to a host processor, transmits a sequence of radar waveforms and receives (multiple) time delayed, frequency shifted, attenuated and phase shifted versions of these waveforms, after reflection by an object in the radar field of view. At the radar transmitter side, a PSK modulation with reduced angle (with a phase difference lower than $\pi$) can be applied to a radar waveform such as a FMCW waveform to encode communication in the phase of the linear ramp. In this context, the modulation containing the information to be transmitted is applied after a mixing stage from an intermediate frequency (IF) to RF. The received phase shifted versions of the waveforms are demodulated back to the IF using the radar signal, without communication embedded therein. The ADC then digitizes the demodulated waveforms, after which they are processed by the digital signal processor.

In some implementations, a down-conversion operation is carried out on the receive-side of the RF transceiver, in which the raw FMCW signal is mixed with the time delayed transmitted signal in the analog domain. In case the relative velocity between the radar system and the reflecting object is zero, the time delayed signal is an attenuated and phase rotated version of the transmitted signal. The result of the down-conversion operation is a sine wave oscillating at the so-called beat frequency. The frequency depends on the distance to the reflecting object and the difference between the start and the stop frequency of the ramp and the duration of the ramp, $T_{ramp}$. In case the relative velocity is non-zero, the corresponding Doppler frequency is added to the beat frequency. When the duration of the chirp is very short, e.g., shorter than 100 μs and the frequency deviation is at least several tens of MHz, the Doppler frequency is very small compared to the beat frequency and can be ignored in the calculation of the distance. The Doppler component may change the phase of the received frequency ramp. A two-dimensional Fast Fourier Transformation (FFT), may be used to calculate the relative radial velocity. The radar detection process then compares the power of the reflected echoes with respect to the noise power. The dynamic range is the ability of the system to detect both strong and weak targets in the presence of noise.

Accordingly, use of the raw FMCW signal as characterized herein may facilitate such a radar detection process, as may be used in automotive applications such as those involving one or more of automated overtake, cooperative collision avoidance, high density platooning, vulnerable road user discovery, "bird's eye" and "see trough" view (e.g., utilizing camera data from another vehicle), and raw data sharing for sensor fusion techniques. Millimeter wave short, medium and long range automotive radar may be enhanced in this regard, as may joint radar-communication functionalities for autonomous driving applications. High bandwidth can be achieved with directive communications for enhanced safety features and cooperative collective perception, which may be used in combination with various v2x protocols.

Radar communication signaling as characterized herein may be carried out in a variety of manners. In some embodiments, a communication signal $\varphi(t)$ is modelled as a random process with $\varphi(t): R \rightarrow A$. The set A contains all phases of the elements in the symbol alphabet, e.g., $A=\{0, k\pi\}$ with $0<k<1$, where the factor k is referred to as a reduction factor and is selected based on a trade-off between radar performance degradation (in term of detection probability $P_D$) and communication error probability $P_e$. Amplitude modulation as well as probabilistic constellation shaping can be used to increase communication raw data rate and lower radar detection probability losses. Synchronization techniques such as de-ramping over the air (DoA) may be used to synchronize with a different radar unit. A further synchronization mechanism between two (or more) radar transceiver apparatuses may be used to ensure that any demodulated signal with the embedded communication appears within the receiver bandwidth of each apparatus.

In a more specific example embodiment, a radar sensing apparatus includes transmit-side circuitry to transmit a sequence of radar waveforms as RF signals that are ramped over a plurality of frequencies (e.g., FMCW signals, which may be transmitted as a ramped radar chirp) and that carry communication data encoded via phase-shift keying (PSK) modulation. For instance, reduced-angle BPSK as characterized herein can be utilized, as may involve BPSK modulation with a modulation angle to minimize compression peak loss and selected to provide a phase difference lower than $\pi$ as applied to a FMCW radar waveform. Receive-side circuitry receives object-reflected versions of RF signals, which may be used to ascertain distance or other radar-based characteristics. The receive-side circuitry also demodulates the received signal waveforms, such as by using a version of the RF signal without the communication data (e.g., prior to modulation), which can mitigate compression peak loss. For instance, the received object-reflected versions of RF signals, which contain the BPSK-modulated communication data, may be deramped using a linearized version of the radar waveforms transmitted as RF signals.

In some implementations, the object-reflected versions of RF signals are versions of the transmitted signals that are reflected by an object in the radar field of view, as time-delayed frequency-shifted attenuated-and-phase-shifted versions of the transmitted radar waveforms. The receive-side circuitry mixes the object-reflected versions of the RF signals with a version of the sequence of radar waveforms that does not have the data encoded via the PSK modulation.

The transmit-side and/or receive-side circuitry may include digital signal processing circuitry. In some implementations, the transmit-side circuitry includes digital signal processing circuitry to process a digitized version of the communication data and a mixer to upconvert. The receive-side circuitry includes digital signal processing circuitry to process a digitized version of the received object-reflected versions of RF signals and a mixer to downconvert. In certain implementations in which the transmit-side circuitry includes an upconverting mixer, the transmit-side circuitry includes modulation circuitry that modulates communication data onto the RF signals after the mixer upconverts from an intermediate frequency (IF) to RF. In a particular embodiment, the transmit-side circuitry includes a mixer that upconverts by using a non-modulated frequency sweep waveform, and the receive-side circuitry includes a mixer that downconverts and includes demodulation circuitry that demodulates the communication data after the mixer downconverts from RF to IF by deramping with the non-modulated frequency sweep waveform, to reduce the loss in a pulse compression peak of the RF signals.

In some embodiments, the transmit-side circuitry causes the radar waveforms to be altered by ramping the radar waveform via a frequency sweep, and the receive-side circuitry accounts for the alteration of the radar waveforms by causing demodulation of the communication data to be applied after the mixer is to downconvert from RF to IF and by deramping with the frequency sweep waveform. This approach may reduce loss in a pulse compression peak of the radar waveforms.

In another specific example embodiment, a radar sensing apparatus includes at least one antenna, transmit-side circuitry, and receive-side circuitry. The transmit-side circuitry includes a first digital data processing module, which transmits a sequence of radar waveforms as RF signals over a radar field of view in a radio frequency (RF) range, from the at least one antenna while ramping over a plurality of frequencies. The RF signals carry communication data encoded via PSK modulation. The receive-side circuitry includes a second digital data processing module, receives object-reflected versions of the RF signals and demodulates the received signal waveforms by deramping the received object-reflected versions of RF signals using a linearized version of the radar waveforms transmitted from the at least one antenna. Accordingly, compression loss can be mitigated via use of the linearized version of the radar waveforms (e.g., a raw FMCW carrier signal, prior to phase modulation). Further the BPSK modulation can be applied at a phase angles of less than π, facilitating enhanced data communication while also mitigating loss at the receive-side circuitry for radar use.

The transmit-side circuitry may generate the radar waveforms in one or more of a variety of manners. For instance, the PSK modulation can be applied to an FMCW carrier signal at a modulation angle less than π, and the receive-side circuitry may use the FMCW carrier signal (as the linearized version of the radar waveforms) to deramp the received signal waveforms. In some implementations, the transmit-side circuitry generates the sequence of radar waveforms by sweeping a carrier signal over a range of frequencies, such as by generating a radar chirp that is swept up or down between respective frequencies, and phase-shifting the swept carrier signal at a modulation angle of less than π to encode the communication data therein.

In a more particular implementations, the transmit-side circuitry includes an oscillator that generates the linearized version of the radar waveforms, and a mixer coupled to receive the linearized version of the radar waveforms from the oscillator. The mixer generates the sequence of radar waveforms by applying the PSK modulation to the linearized version of the radar waveforms. The receive-side circuitry also includes a mixer that is also coupled to oscillator for receiving the linearized version of radar waveforms therefrom. The mixer deramps the received object-reflected versions of RF signals using the linearized version of the radar waveforms received from the oscillator. It has been recognized/discovered that such an approach, in which a version of the radar waveform without the PSK modulation therein is used to deramp, can mitigate signal loss.

As may be implemented with one or more embodiments, a method for use with a radar sensing apparatus is carried out as follows. A sequence of radar waveforms are transmitted in a radar field of view and in a radio frequency (RF) range, as RF signals while ramping over a plurality of frequencies. For instance, transmit-side circuitry may ramp a carrier signal up or down over a range of frequencies, to generate a radar chirp. The RF signals also carry communication data encoded via PSK modulation. Object-reflected versions of the RF signals are received and demodulated by deramping the received object-reflected versions of RF signals using a linearized version of the radar waveforms to mitigate compression peak loss. For instance, receive-side circuitry may utilize such a linearized version, which may coincide with a carrier signal used to generate the radar waveforms in the transmit-side circuitry.

The radar waveforms may be generated in one or more of a variety of manners. In some embodiments, BPSK modulation is applied to an FMCW carrier signal at a modulation angle less than π, and the FMCW carrier signal is used to deramp reflected versions of the signal waveforms. In certain embodiments, a carrier signal is swept over a range of frequencies and the swept carrier signal is phase-shifted using reduced-angle BPSK at a modulation angle of less than π to encode the communication data therein. These or other embodiments may involve generating the waveforms as a radar chirp that is swept up or down between respective frequencies, and phase-shift keying the radar chirp at a modulation angle of less than π.

Turning now to the figures, FIG. 1 shows an apparatus 100 having an example transmit-side and receive-side circuitry 110 and 120, in accordance with the present disclosure. By way of example, the transmit-side circuitry 110 is depicted with a phase-locked loop (PLL) 111, mixer 112, and power amplifier 114. The mixer 112 is coupled to receive a PSK input, which may be provided by a reduced-angle PSK (Mr-PSK) module 113. The power amplifier 114 amplifies the output of the mixer 112 for transmission via antenna 115. The receive-side circuitry 120 is depicted, by way of example, with an amplifier 122 that receives signals via antenna 121, a mixer 123 coupled to receive the output of the PLL 111, a filter 124 and an ADC 125.

In some implementations, the PLL 111 generates a ramped FMCW radar signal that is passed (e.g., divided on two branches) to mixers 112 and 123. Mixer 112 mixes the ramped FMCW using a PSK signal from the Mr-PSK module 113, which may be part of the transmit-side circuitry 110. The power amplifier 114 transmits the mixed signal via the antenna 115, and reflections of the transmitted signal are captured by the receiving antenna 121. The received reflection is then amplified at 122 (e.g., a low-noise amplifier (LNA)) and downconverted to an intermediate frequency (IF) by the mixer 123, using the ramped FMCW generated by the PLL 111. The filter 124 is implemented as an anti-aliasing filter (AAF), and further limits unwanted noise prior to the signal being digitized using the ADC 125. Further transmitter and receiver channels, in phased array or MIMO configurations, can be used to enable radar angular capability. A timing block 130 may be utilized by the transmit-side and/or receive-side circuitry 110 and 120 for synchronization. Rectangular pulse shaping may be utilized, such that φ(t) is constant for the duration of $R_{sym-1}$, where $R_{sym-1}$ is the symbol rate, and φ(t) is independent of φ2(t) if $|t_1-t_2|<R_{sym-1}$. High data rates may be facilitated by choosing $R_{sym}=f_s$, where $f_s$ represents the system sampling frequency. The number of samples within one chirp duration is $N=T_{ramp} f_s$, which is equal to the number of phase changes when digital modulation is applied. In some implementations, a synchronization method among transmit-receive circuitries is used to maximize transmitted data rates.

Figures 2A, 2B:
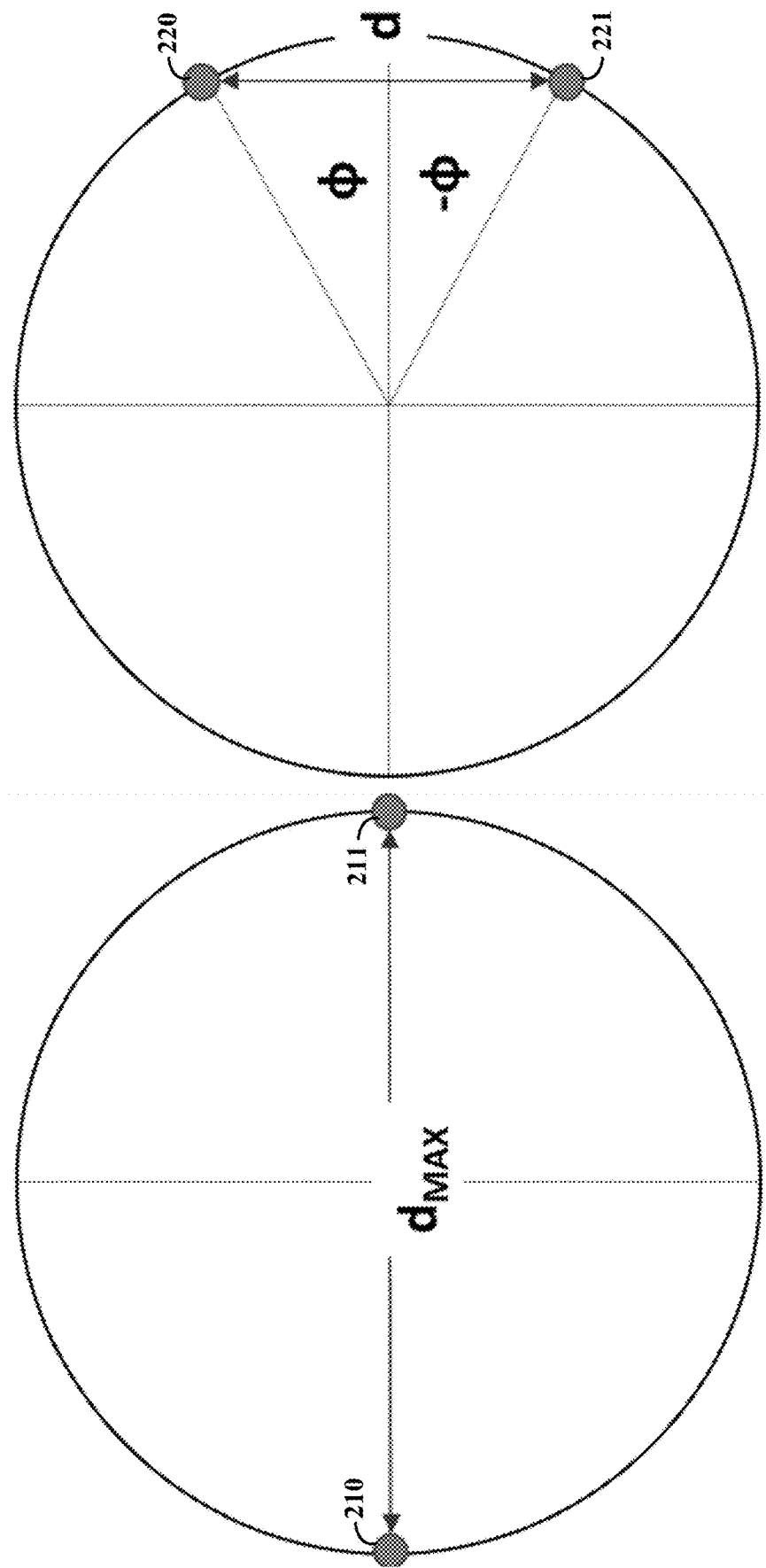

FIGS. 2A-2F show respective plots characterizing the use and processing of phase-shifted radar signals in accordance with the present disclosure. Beginning with FIG. 2A, an initial bipolar phase-shift keying (BPSK) signal is shown having a phase shift of π (180 degrees) as depicted by constellation points 201 and 211, and FIG. 2B shows the phase-shifted BPSK signal implemented with reduced phase angles (rBPSK) as depicted by constellation points 220 and 221 and respective phase angles ±φ, relative to zero (or 2π). The BPSK modulation shown at FIG. 2A changes the phase of π of every bit, while for the rBPSK depicted at FIG. 2B the phase is only changed by a small portion of π, such as π/9. In reducing the modulation angle, the phase of the chirp may not vary consistently with respect to the FMCW without communication, which leads to different performance if the range-Doppler map is calculated.

Figure 2D:
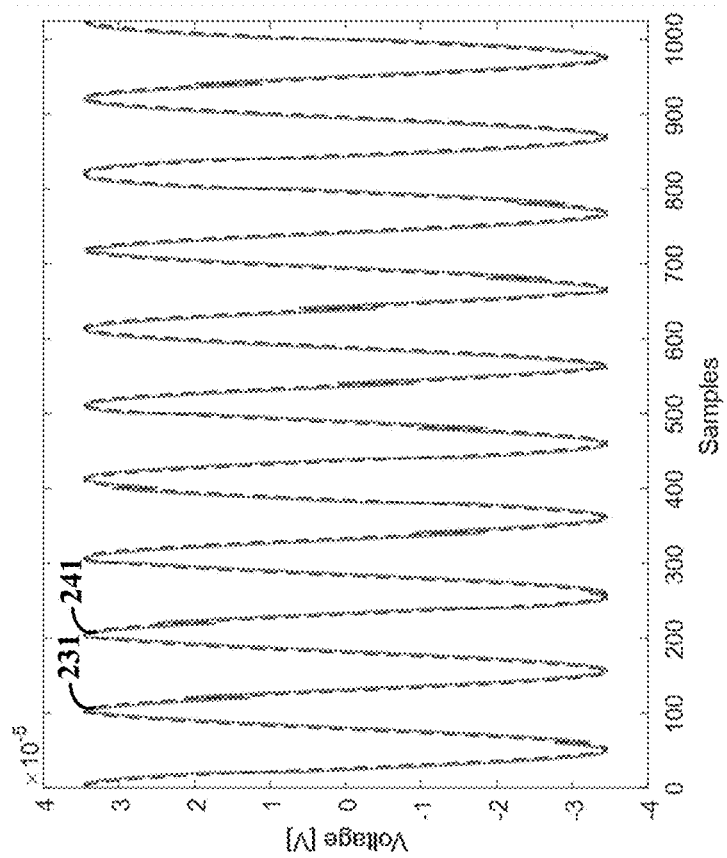
Figure 2C:
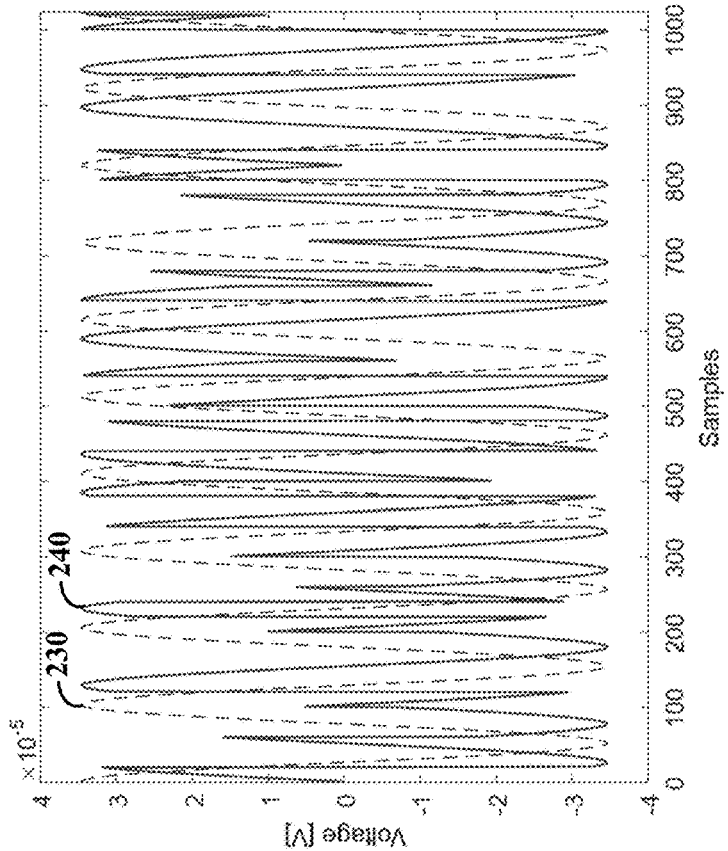

FIG. 2C shows voltage differences between an initial FMCW radar signal 230 and a BPSK version of the FMCW signal 240, and FIG. 2D shows such a difference between an initial FMCW radar signal 231 as in FIG. 2C and a reduced-phase shift BPSK signal 241, using a reduced phase angle (Δφ=π/9).

Figures 2E, 2F:
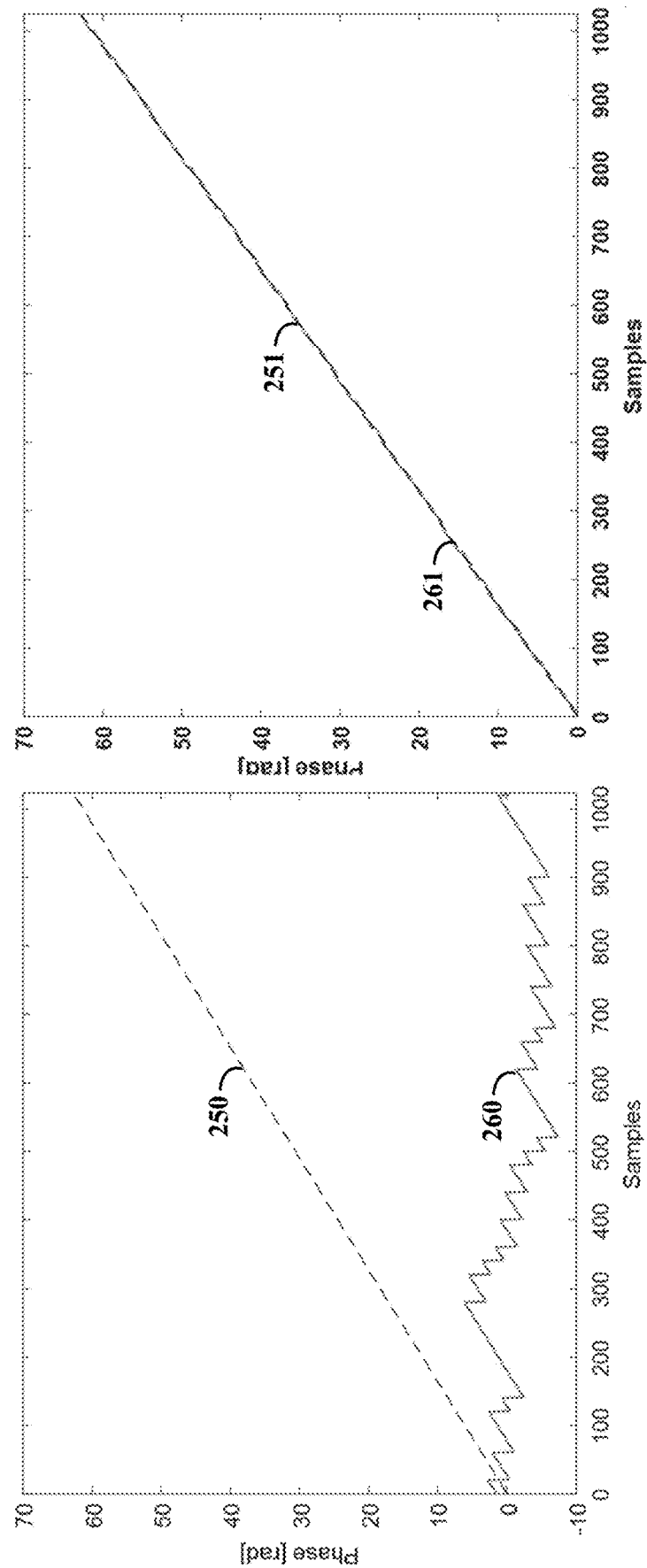

FIGS. 2E and 2F similarly show phase differences relative to an initial FMCW radar signal, in which FIG. 2E shows the phase of a FMCW radar signal 250 and of a BPSK version of the FMCW 260. FIG. 2F shows phase differences between the FMCW radar signal (251) and a reduced-phase shift BPSK (r-BPSK FMCW) version (Δφ=π/9) of the signal 261. Accordingly, by reducing the phase angle, the ability of detecting the range and the velocity of the target is preserved, as well as the dynamic range. Reducing the phase angle of the BPSK symbols reduces their distance and thus the required signal-to-noise ratio (SNR) increases for a comparable bit error rate (BER). The transmit power of the radar signal can be chosen for a two-way path. In contrast, the communication signal passes only a one-way path meaning that the SNR for the communication signal can be assumed to be high. Thus, reliable communication with reduced phase angles can be performed. Furthermore, demodulation without the communication signal can be applied on reflected portions of the signals to achieve enhanced performance in terms of peak reduction can be achieved. A reduction of the phase angle can be increased to enhance communication ability in terms of lower error probability.

Figure 3:
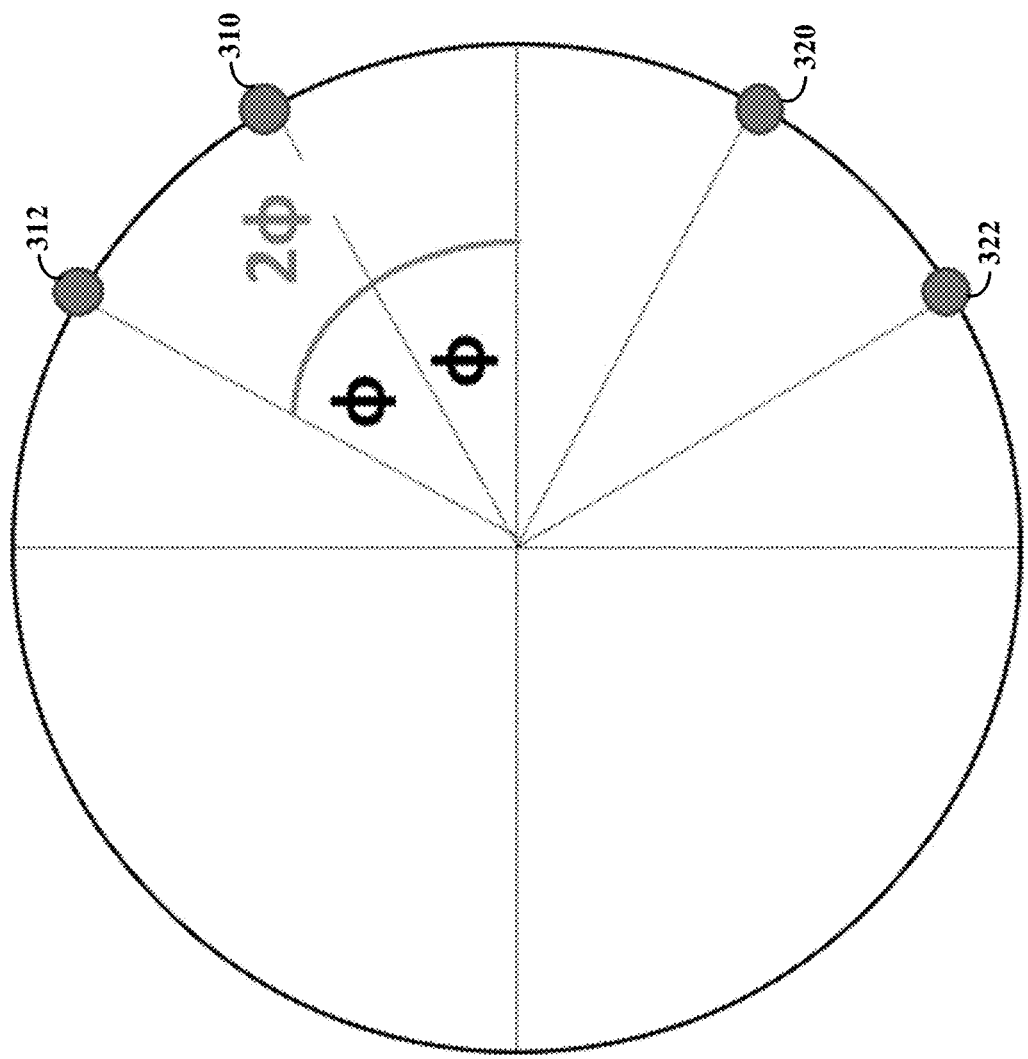
FIG. 3 is a plot of an example radar signal phase-shifting approach, in accordance with the present disclosure.

FIG. 3 depicts a plot of an example radar signal phase-shifting approach, in accordance with the present disclosure. Four constellation points 210 and 212, as well as 220 and 222, may be utilized to provide multiple phase shifts respectively separated by φ (e.g., π/6). This may be referred to as a 4r-PSK approach. The data rate, which may be limited by any filtering approach, can be extended and the reduction factor can be further limited. For instance, using a phase difference of 2φ, smaller phase jumps of φ can be used with multiple constellation points. Probabilistic constellation shaping may be used to further reduce radar degradation, such as by assigning a low probability to larger phase jumps that can cause phase distortion in radar processing algorithms.

Figure 4:
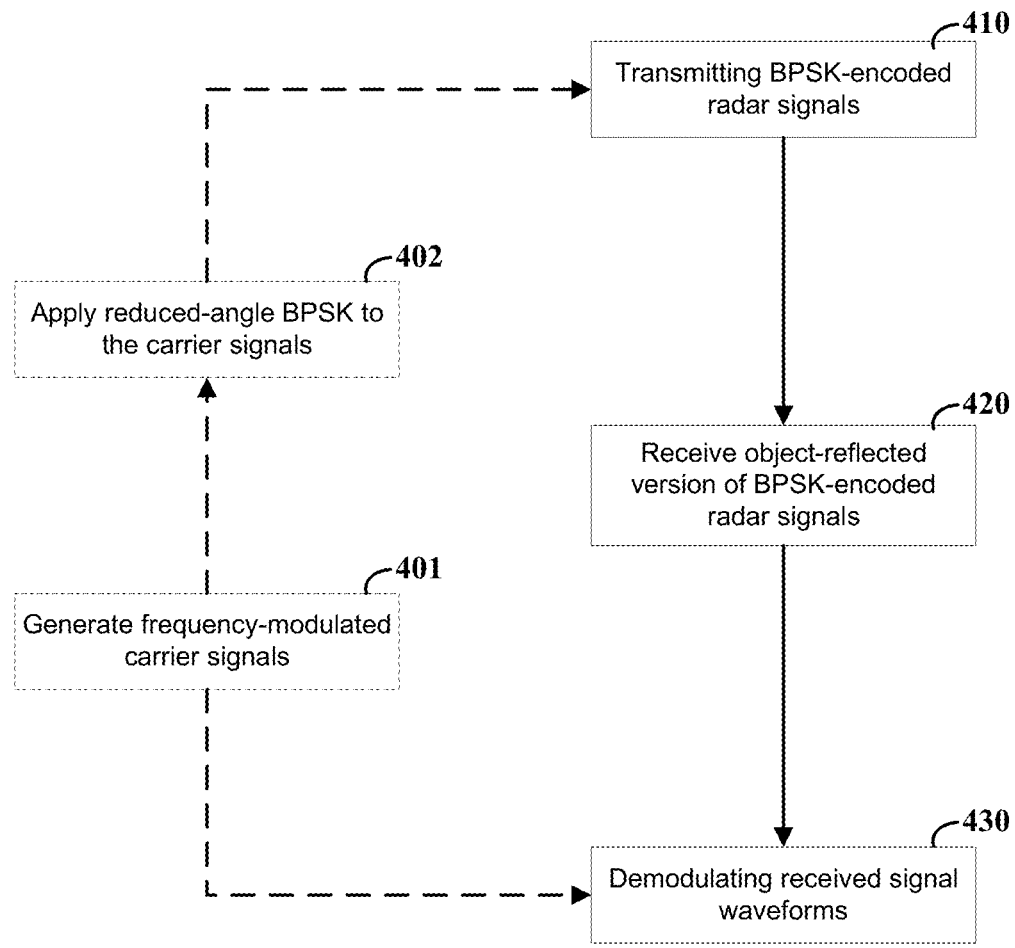
FIG. 4 is a flow diagram for processing radar signals, in accordance with the present disclosure.

FIG. 4 is a flow diagram for processing radar signals, in accordance with the present disclosure. At block 410, BPSK-encoded radar signals are transmitted, and object-reflected versions of the BPSK-encoded radar signals are received at block 420. These reflections can be received from a multitude of objects in a local environment in which the signals are transmitted, such as in an environment around a moving vehicle. At block 430, the waveforms are demodulated. In this context, the data encoded in the transmitted signals can be received and utilized by another receiver, such as in another vehicle in the local environment. Further, consistent with recognitions/discoveries as characterized herein, by using a version of the transmitted signals without data encoded therein, ensuing processing for radar functions can be enhanced. For instance, when used in vehicle-to-vehicle communications, the same radar signal transmission can be utilized for communicating information to other vehicles and ascertaining radar-based characteristics of the other vehicles (e.g., distance).

In some implementations, the BPSK-encoded radar signals that are transmitted at block 410 are also generated. At block 401, frequency-modified carrier signals are generated. At block 402, reduced-angle BPSK is applied to the carrier signals, to encode data therein. Reduced-angle, in this context, refers to applying phase shifts of less than 180 degrees to the carrier signals. For instance, oscillator and reduced-angle PSK circuitry such as shown in FIG. 1 can be utilized to respectively generate and apply PSK to carrier signals, with an offset that is less than 180 degrees (or π), such as shown in FIG. 2B.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the specification (including claims) connote a plain meaning in the art unless otherwise indicated. As examples, the specification describes and/or illustrates aspects useful for implementing the claimed disclosure by way of various circuits or circuitry which may be illustrated as or using terms such as blocks, modules, signal generator, oscillator, device, system, unit, controller, transmitter, receiver, transceiver and/or other circuit-type depictions (e.g., reference numerals 110-114 and 122-125 of FIG. 1 may be implemented as a block/module as described herein). Such circuits or circuitry may be used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 1 and 4. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as shown in and described in connection with FIG. 4 is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the transceiver or receiver circuitry as characterized herein may further be implemented to process received radar signals from other vehicles for ascertaining data therefrom. As another example, multiple transceivers and/or receivers may be implemented in accordance with various embodiments, in a similar manner for effecting radar functions (e.g., around an entire vehicle). Various other PSK approaches may be used, with additional and/or fewer constellation points. Such modifications do not depart from the true spirit and scope of various aspects of the disclosure, including aspects set forth in the claims.

What is claimed is:

1. A radar sensing apparatus, comprising:
   transmit-side circuitry to transmit, in a radar field of view and in a radio frequency (RF) range, a sequence of radar waveforms as RF signals carrying encoded communication data while ramping over a plurality of frequencies, and to encode communication data of RF signals via phase-shift keying (PSK) modulation at a modulation angle less than π to produce the RF signals carrying encoded communication data; and
   receive-side circuitry to receive object-reflected versions of the RF signals carrying encoded communication data and to demodulate the object-reflected versions of the RF signals using a version of the sequence of radar waveforms transmitted from at least one antenna, the version of the sequence of radar waveforms lacking the communication data encoded via the PSK modulation.

2. The apparatus of claim 1, wherein the object-reflected versions of the RF signals are caused by being reflected by an object in the radar field of view, as time-delayed frequency-shifted attenuated-and-phase-shifted versions of radar waveforms of the transmitted sequence of radar waveforms, and wherein the receive-side circuitry is configured to mix the object-reflected versions of the RF signals carrying encoded communication data with the version of the sequence of radar waveforms that does not have the communication data encoded via the PSK modulation.

3. The apparatus of claim 1, wherein the PSK modulation includes bipolar PSK (BPSK) modulation that has a modulation angle modified to minimize compression peak loss and selected to provide a phase difference lower than π as applied to a FMCW radar waveform.

4. The apparatus of claim 1, wherein the transmit-side circuitry includes digital signal processing circuitry to process a digitized version of the communication data of RF signals and a mixer to upconvert, and the receive-side circuitry includes digital signal processing circuitry to process a digitized version of the received object-reflected versions of the RF signals carrying encoded communication data and a mixer to downconvert.

5. The apparatus of claim 1, wherein the transmit-side circuitry includes a mixer to upconvert, and includes modulation circuitry configured to cause the modulation of the communication data of RF signals to be applied after the mixer is to upconvert from an intermediate frequency (IF) to RF.

6. The apparatus of claim 1, wherein
   the transmit-side circuitry includes a mixer to upconvert by using a non-modulated frequency sweep waveform, and
   the receive-side circuitry includes a mixer to downconvert and includes demodulation circuitry configured to cause demodulation of the communication data of the RF signals to be applied after the mixer is to downconvert from RF to IF by deramping with the non-modulated frequency sweep waveform to reduce loss in a pulse compression peak of the received object-reflected versions of the RF signals carrying encoded communication data.

7. The apparatus of claim 6, wherein:
   the transmit-side circuitry is configured to cause radar waveforms of the sequence of radar waveforms to be altered by ramping the radar waveforms of the sequence of radar waveforms via a frequency sweep, and
   the receive-side circuitry is configured to account for the alteration of the radar waveforms of the sequence of radar waveforms by causing demodulation of the communication data of RF signals to be applied after the mixer is to downconvert from RF to IF and by deramping with a frequency sweep waveform, and therein to reduce the loss in a pulse compression peak of the radar waveforms of the sequence of radar waveforms.

8. The apparatus of claim 1, wherein the receive-side circuitry is to apply a demodulation scheme which includes deramping the received object-reflected versions of the RF signals carrying encoded communication data using a linearized version of radar waveforms of the sequence of radar waveforms transmitted as RF signals.

9. The apparatus of claim 1, wherein radar waveforms of the sequence of radar waveforms transmitted as the RF signals carrying encoded communication data are FMCW signals.

10. A radar sensing apparatus, comprising:
    at least one antenna;
    transmit-side circuitry, including a first digital data processing module, to transmit over a radar field of view in a radio frequency (RF) range, a sequence of radar waveforms as RF signals carrying encoded communication data from said at least one antenna while ramping over a plurality of frequencies, and to encode communication data of RF signals via PSK modulation to produce the RF signals carrying encoded communication data; and
    receive-side circuitry, including a second digital data processing module, to receive object-reflected versions of the RF signals carrying encoded communication data and to demodulate received signal waveforms by deramping the received object-reflected versions of the RF signals carrying encoded communication data using a linearized version of radar waveforms of the sequence of radar waveforms transmitted from said at least one antenna.

11. The radar sensing apparatus of claim 10, wherein:
    the transmit-side circuitry is configured to generate the radar waveforms of the sequence of radar waveforms by applying the PSK modulation to an FMCW carrier signal at a modulation angle less than $\pi$; and the receive-side circuitry uses the FMCW carrier signal as the linearized version of the radar waveforms of the sequence of radar waveforms to deramp the received signal waveforms.

12. The radar sensing apparatus of claim 10, wherein the transmit-side circuitry is configured to generate the sequence of radar waveforms by sweeping a carrier signal over a range of frequencies and phase-shifting a swept carrier signal at a modulation angle of less than $\pi$ to encode the communication data of RF signals therein.

13. The radar sensing apparatus of claim 12, wherein the transmit-side circuitry is configured to ramp the carrier signal over the range of frequencies by generating a radar chirp that is swept up or down between respective frequencies.

14. The radar sensing apparatus of claim 10, wherein:

the transmit-side circuitry includes an oscillator configured to generate the linearized version of the radar waveforms of the sequence of radar waveforms, and a mixer coupled to receive the linearized version of the radar waveforms of the sequence of radar waveforms from the oscillator and configured to generate the sequence of radar waveforms by applying the PSK modulation to the linearized version of the radar waveforms of the sequence of radar waveforms; and the receive-side circuitry includes a mixer coupled to the oscillator for receiving the linearized version of the radar waveforms therefrom, the mixer being configured to deramp the received object-reflected versions of the RF signals carrying encoded communication data using the linearized version of the radar waveforms of the sequence of radar waveforms received from the oscillator.

15. The radar sensing apparatus of claim 10, wherein the transmit-side circuitry is configured to generate the radar waveforms of the sequence of radar waveforms by applying high order PSK modulation to increase a rate at which data is communicated via the radar waveforms of the sequence of radar waveforms.

16. The radar sensing apparatus of claim 10, wherein the transmit-side circuitry is configured to generate the radar waveforms of the sequence of radar waveforms by applying probabilistic shaping on high order PSK modulation to increase a rate at which data is communicated via the radar waveforms of the sequence of radar waveforms and to reduce compression peak loss.

17. For use with a radar sensing apparatus, a method comprising:

transmitting from transmit-side circuitry, in a radar field of view and in a radio frequency RF) range, a sequence of radar waveforms as RF signals while ramping over a plurality of frequencies, the RF signals carrying communication data encoded via PSK modulation;

receiving, by receive-side circuitry, object-reflected versions of the RF signals carrying encoded communication data; and demodulating received signal waveforms by deramping the received object-reflected versions of the RF signals carrying encoded communication data using a linearized version of radar waveforms of the sequence of radar waveforms transmitted by at least one antenna to mitigate compression peak loss.

18. The method of claim 17, further including generating the radar waveforms of the sequence of radar waveforms by applying the PSK modulation to an FMCW carrier signal at a modulation angle less than $\pi$, and using the FMCW carrier signal as the linearized version of the radar waveforms of the sequence of radar waveforms to deramp the received signal waveforms.

19. The method of claim 17, further including generating the sequence of radar waveforms by sweeping a carrier signal over a range of frequencies and phase-shifting a swept carrier signal using reduced-angle BPSK at a modulation angle of less than $\pi$ to encode the communication data therein.

20. The method of claim 17, further including generating the sequence of radar waveforms by generating a radar chirp that is swept up or down between respective frequencies, and phase-shift keying the radar chirp at a modulation angle of less than $\pi$.

21. The method of claim 17, wherein the receive-side circuitry includes a mixer coupled to an oscillator configured for receiving the linearized version of the radar waveforms, the method further including deramping the received object-reflected versions of the RF signals carrying encoded communication data using the linearized version of the radar waveforms of the sequence of radar waveforms received from the oscillator.

\* \* \* \* \*